United States Patent [19]

Sorenson

[11] Patent Number: 4,784,735
[45] Date of Patent: * Nov. 15, 1988

[54] CONCENTRIC TUBE MEMBRANE ELECTROLYTIC CELL WITH AN INTERNAL RECYCLE DEVICE

[75] Inventor: Marius W. Sorenson, Lake Jackson, Tex.

[73] Assignee: The Dow Chemical Company, Midland, Mich.

[*] Notice: The portion of the term of this patent subsequent to Feb. 28, 1995 has been disclaimed.

[21] Appl. No.: 934,770

[22] Filed: Nov. 25, 1986

[51] Int. Cl.⁴ .......................... C25B 1/16; C25B 1/26; C25B 9/00; C25B 15/08
[52] U.S. Cl. ...................................... 204/98; 204/128; 204/237; 204/253; 204/260; 204/263; 204/283; 204/284; 204/292; 204/290 F; 204/290 R; 204/293
[58] Field of Search ...................... 204/260, 257–258, 204/290 R, 290 F, 292–293, 283–284, 98, 128, 263–266, 237

[56] References Cited

U.S. PATENT DOCUMENTS

| | | | |
|---|---|---|---|
| B 388,701 | 1/1975 | Johnson | 204/258 |
| 522,617 | 7/1894 | Roberts | 204/263 |
| 590,826 | 9/1897 | Darling | 204/295 |
| 673,452 | 5/1901 | Roberts | 204/260 |
| 914,856 | 3/1909 | Meyer | 204/260 |
| 1,074,549 | 9/1913 | Henkel et al. | 204/260 |
| 1,982,224 | 11/1934 | Michel | 204/260 |
| 2,322,545 | 6/1943 | Sandström | 204/260 |
| 2,349,998 | 5/1944 | Trinius | 204/260 |
| 2,583,101 | 1/1952 | Oliver | 204/260 |
| 3,236,692 | 2/1966 | Lewis | 204/260 X |
| 3,344,053 | 9/1967 | Neipert et al. | 204/266 |
| 3,390,065 | 6/1968 | Cooper | 204/95 |
| 3,595,774 | 7/1971 | Bremerman | 204/196 |
| 3,653,998 | 4/1972 | Sandstrom | 156/6 |
| 3,659,001 | 4/1972 | Mills | 204/274 |
| 3,671,415 | 6/1972 | King et al. | 204/284 |
| 3,676,325 | 7/1972 | Smith et al. | 204/288 |
| 3,721,619 | 3/1973 | Ruehlen | 204/272 |
| 3,726,781 | 4/1973 | Verneuil | 204/286 |
| 3,798,755 | 3/1974 | Sandstrom | 29/592 |
| 3,804,739 | 4/1974 | Bergeron | 204/266 |
| 3,812,026 | 5/1974 | Bertrand et al. | 204/270 |
| 3,853,735 | 12/1974 | Shepard, Jr. et al. | 204/260 |
| 3,853,738 | 12/1974 | Loftfield et al. | 204/286 |
| 3,891,532 | 6/1975 | Jensen et al. | 204/260 |
| 3,919,068 | 11/1975 | Gary | 204/197 |
| 3,933,614 | 1/1976 | Bunn, Jr. | 204/266 |
| 3,957,615 | 5/1976 | Diefenbacher et al. | 204/260 |
| 3,962,065 | 6/1976 | Scoville | 204/256 |
| 3,972,795 | 8/1976 | Goens et al. | 204/269 |
| 3,984,303 | 10/1976 | Peters et al. | 204/260 |
| 3,990,962 | 11/1976 | Gotz | 204/268 |
| 4,013,538 | 3/1977 | Schneider et al. | 204/280 |
| 4,029,565 | 6/1977 | Bender et al. | 204/256 |
| 4,040,938 | 8/1977 | Robertson | 204/283 |
| 4,042,481 | 8/1977 | Kelly | 204/270 |
| 4,048,047 | 9/1977 | Beck et al. | 204/270 |
| 4,064,021 | 12/1977 | de Nora et al. | 204/98 |
| 4,107,024 | 8/1978 | Fukuzuka et al. | 204/275 |
| 4,117,116 | 9/1978 | Buehler et al. | 424/157 |
| 4,125,439 | 11/1978 | Fleischmann et al. | 204/1 R |

(List continued on next page.)

Primary Examiner—Donald R. Valentine

[57] ABSTRACT

The invention is a vertically disposed electrolytic cell comprising:
a hollow, cylindrically shaped recycle tube;
a hydraulically permeable, hollow, cylindrically shaped cathode concentric with and surrounding said recycle tube to define a first annular space therebetween;
a hydraulically permeable, hollow, cylindrically shaped anode concentric with and surrounding said cathode to define a second annular space therebetween; and
a hollow, cylindrically shaped, ion permeable membrane positioned in said second annular space concentric with said cathode and said anode, said membrane dividing the second annular space into an anode compartment containing the anode and a cathode compartment containing the cathode.

The invention includes a method for operating the apparatus.

21 Claims, 2 Drawing Sheets

U.S. PATENT DOCUMENTS

| | | | |
|---|---|---|---|
| 4,136,002 | 1/1979 | Bober et al. | 204/225 |
| 4,136,004 | 1/1979 | Kamarian et al. | 204/256 |
| 4,169,035 | 9/1979 | Stummer et al. | 204/260 |
| 4,170,535 | 10/1979 | Smura | 204/279 |
| 4,177,016 | 12/1979 | Aude | 417/53 |
| 4,201,651 | 5/1980 | Themy | 204/217 |
| 4,203,818 | 5/1980 | Greaves | 204/212 |
| 4,246,554 | 1/1981 | Swanson et al. | 333/192 |
| 4,268,371 | 5/1981 | Brun et al. | 204/196 |
| 4,290,873 | 9/1981 | Weaver | 204/228 |
| 4,316,789 | 2/1982 | Iijima et al. | 204/296 |
| 4,316,790 | 2/1982 | Iijima et al. | 204/296 |
| 4,323,443 | 4/1982 | Pere | 204/253 |
| 4,364,815 | 12/1982 | Darlington et al. | 204/283 |
| 4,374,014 | 2/1983 | Smith et al. | 204/260 |
| 4,388,162 | 6/1983 | Sammells et al. | 204/78 |
| 4,406,768 | 9/1983 | King | 204/268 |
| 4,409,084 | 10/1983 | Yamaguchi et al. | 204/257 |
| 4,417,959 | 11/1983 | Kadija et al. | 204/98 |
| 4,417,970 | 11/1983 | Yamaguchi et al. | 204/257 |
| 4,426,261 | 1/1984 | Fushihara | 204/98 |
| 4,426,262 | 1/1984 | Langley et al. | 204/98 |
| 4,439,295 | 3/1984 | Richards | 204/229 |
| 4,537,673 | 8/1985 | Asawa et al. | 204/253 |
| 4,654,137 | 3/1987 | Vaughan | 204/260 X |

CONCENTRIC TUBE MEMBRANE ELECTROLYTIC CELL WITH AN INTERNAL RECYCLE DEVICE

The present invention relates to electrolytic cells and particularly to concentric, cylindrically shaped, ion permeable membrane electrolytic cell having an internal recycle device.

BACKGROUND OF THE INVENTION

Throughout the years, electrolytic cells have been made in a wide variety of shapes and sizes, including concentric, cylindrically shaped electrolytic cells. In fact, some of the earliest electrolytic cell designs were concentric, cylindrically shaped cells (see for example U.S Pat. Nos.: 522,617; 590,826; 673,452; 914,856; 1,074,549; 2,583,101; 3,812,026; 3,984,303; 4,117,116; 4,256,554; 4,374,014; and B388,701.

In concentric, cylindrically shaped cells, one electrode surrounds the other electrode. In the various patents of the prior art, the anode and the cathode have each occupied both the inner position and the outer position. Most commonly, however, the cathode surrounds the anode and is separated therefrom by a hydraulically permeable diaphragm. In chlor-alkali cells, sodium chloride brine solution is fed into an anode compartment where it is electrolyzed to form chlorine. Chlorine forms large bubbles and rises to the top of the anode compartment where it separates from the brine and is removed. During operation of the cell, a portion of the brine flows from the anode compartment, through the hydraulically permeable diaphragm, and into the cathode compartment. There, it is electrolyzed to form hydrogen and sodium hydroxide. Hydrogen forms small bubbles and is swept away from the diaphragm and the cathode by additional brine flowing through the diaphragm into the cathode compartment. The hydrogen gas bubbles flow into an upper portion of the cathode compartment, where they are separated from the sodium hydroxide/brine mixture.

Phenomena of bubble formation is discussed in U.S. Pat. No. 4,265,719 "Electrolysis of Aqueous Solutions of Alkali Metal Halides Employing a Flexible Polymeric Hydraulically Impermeable Membrane Disposed Against A Roughened Surface Cathode; and U.S. Pat. No. 4,329,218 "Vertical Cathode Pocket Assembly for Membrane Type Electrolytic Cell", Sorenson, Ezzell and Pimlott. These patents are incorporated by reference for the purposes of their teachings about hydrogen bubble formation at cathodes in chlor-alkali cells.

With the recent advent of ion permeable membranes which are used to replace hydraulically permeable diaphragms, the use of cylindrically shaped, concentric, electrolytic cells has declined, and particularly their use for the production of chlorine and caustic. Since ion permeable membranes do not allow substantial amounts of free water to pass from the anode compartment into the cathode compartment, there is nothing to sweep away the hydrogen bubbles. As a result, hydrogen builds up and tends to block the flow of electrical energy at electrodes, thus increasing the amount of energy the cell uses. This blinding problem is present in most electrolytic cells that produce a gaseous product at one of the electrodes.

Another problem with cells that use ion permeable membranes is the somewhat short lifetime of the ion permeable membrane in some cells. Short membrane lifetime is sometimes a particularly troublesome problem when composite membranes (2 or more layers laminated together) are used. Such membranes are prone to delamination, which almost totally ruins the usefulness of the membrane. Membrane delamination is thought to be caused by exposure to highly concentrated alkaline hydroxide solutions or by simultaneous exposure to two phases, a liquid and a gaseous phase. An electrolytic method which lengthened the lifetime of composite membranes would certainly be desirable.

The present invention provides a method for operating a cylindrically shaped, electrolytic cell employing ion permeable membranes in a manner to minimize the build-up of gas at the cathode, thus minimizes electrical inefficiencies due to gas blinding. In addition, the present invention provides a method for operating an electrochemical cell in a manner to minimize delamination of composite ion permeable membranes. The present invention is particularly useful in chlor-alkali cells.

SUMMARY OF THE INVENTION

The invention is a vertically disposed electrolytic cell comprising:

a hollow, cylindrically shaped recycle tube;

a hydraulically permeable, hollow, cylindrically shaped cathode concentric with and surrounding said recycle tube to define a first annular space therebetween;

a hydraulically permeable, hollow, cylindrically shaped anode concentric with and surrounding said cathode to define a second annular space therebetween; and a hollow, cylindrically shaped, ion permeable membrane positioned in said second annular space concentric with said cathode and said anode, said membrane dividing the second annular space into an anode compartment containing the anode and a cathode compartment containing the cathode.

The invention includes a method for operating the apparatus which comprises:

(a) flowing a catholyte from a lower portion of the first annular space, upward toward an upper portion of the first annular space, at least a portion of said flow passing adjacent to the cathode at a rate sufficient to sweep away at least a portion of any gas, formed during electrolytic operation of the cell;

(b) flowing the catholyte and gas upward and into a catholyte separation compartment;

(c) separating the gas from the catholyte; and (d) recycling at least a portion of the catholyte through the hollow internal portion of the recycle tube to a lower portion of the first annular space, where the above-described flow pattern is repeated.

PREFERRED EMBODIMENT OF THE INVENTION

As used herein, "cell unit" means one anode/cathode/membrane combination.

"Cell" means a plurality of cell units positioned in proximity to each other; electrically connected to each other; and surrounded by a housing unit.

The method of the present invention provides a method for the efficient use of cylindrically shaped, concentric, electrochemical cells which use ion permeable membranes. The method involves operating such a cell in a manner to minimize the buildup of hydrogen at the cathode which tends to block the electrochemical reactions occurring at the cathode.

The invention includes a method for operating the apparatus which includes flowing catholyte from a lower portion of the first annular space, upward toward an upper portion of the first annular space, at least a portion of said flow passing adjacent to the cathode at a rate sufficient to sweep away at least a portion of any gas, formed during electrolytic operation of the cell. This minimizes the buildup of hydrogen at the cathode and maximizes the contact of electrolyte with the cathode. The gas produced at the cathode mixes with the catholyte and rises toward a catholyte separation compartment. Since the gas has a density lower than the electrolyte, it rises in the electrolyte. However the upward motion of the gas tends to carry at least of portion of the catholyte upward also. When the gas/catholyte mixture reaches the upper portion of the cell unit, it enters a catholyte separation compartment where the gas separates from the catholyte. The catholyte has a density greater than the gas/catholyte mixture and tends to flow downward in the cell unit. The presence of the recycle device enhances the flow of catholyte back to the lower portion of the cell, where it can then repeat its above-described flow pattern.

Although the present invention can be used in any cylindrically shaped electrolytic cell, it will be primarily discussed herein with respect to its use in a chlor-alkali cell. However the teachings apply to any cylindrically shaped cell wherein a gas is produced at the inner electrode.

The present invention also provides a method for minimizing delamination problems with composite ion permeable membranes. The upward flow of catholyte between the ion permeable membrane and the cathode has been found to minimize the buildup of high concentration sodium hydroxide adjacent to the membrane. This minimizes the likelihood of delamination of the membrane.

The herein disclosed electrolytic cell is diagrammaticaly set forth in FIGS. 1–5 and will be described in detail with reference to them.

Figure 1:
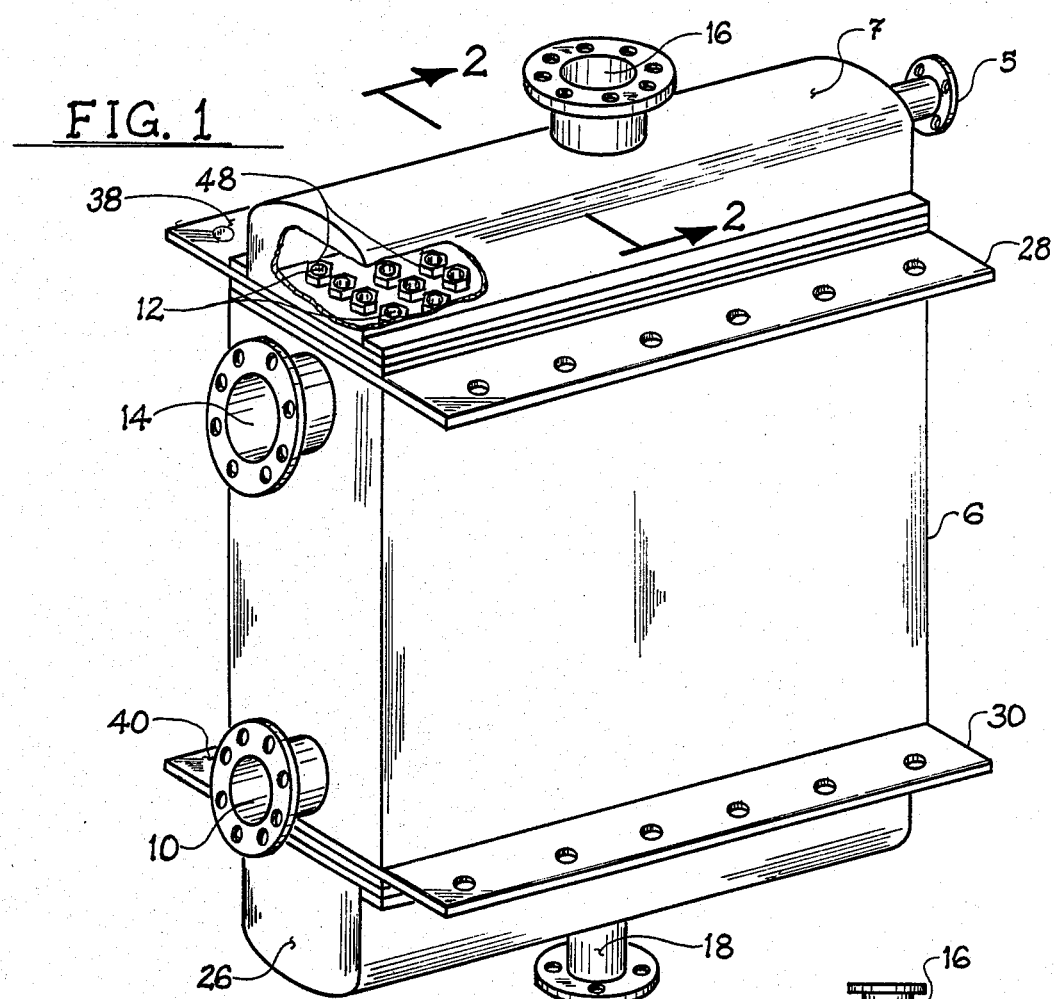
FIG. 1 is an overall perspective view of a cell with the housing unit partially in phantom revealing the tops of cell units and conduits for the insertion and removal of reactants and products.

FIG. 1 shows a housing unit 6 whose top cover 8 is shown in phantom. The housing unit 6 is isolated here, but optionally, may be electrically connected to other similar housings, as will be discussed later.

The cell housing 6 has a lower inlet 10 which is an opening for feeding electrolyte (brine in the case of chlor-alkali cells), and optionally recycling anolyte, into each cell housing 6. Inside the cell housing 6, the electrolyte surrounds a plurlity of anodes thus becoming anolyte. Each of the anodes (not shown in this Figure) are electrically connected through plates 28 and 30 to a power supply (not shown).

A plurality of cathode chambers 12 is formed inside each of a plurality of cathodes. Each of the cathode chambers connects with a cathode separation compartment 7 positioned in the upper portion of the cell housing 6. Each cathode is electrically connected to a power supply (not shown) through plates 38 and 40. Nuts 48 connect the cathodes to the plates 38 and 40.

The cathode separation compartment 7 has an outlet 5 which provides a pathway for the removal of gas and catholyte. Optionally, more than one outlet may be provided from the cathode sepration compartment 7. Outlet 5 may be connected to opening 18 to provide a pathway for recycling the catholyte through the cathode chambers 12, and back into cathode separation compartment 7. If outlet 5 is connected with opening 18, the line connecting the two (not shown) might optionally contain a pump to force circulation of the catholyte back through the cell. Optionally, the line might contain a valve to adjust the flow.

Figure 2:
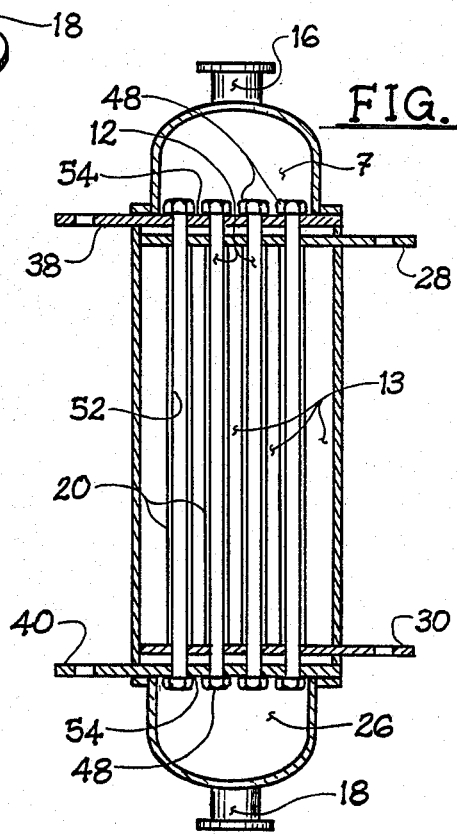
FIG. 2 is a view of the same housing unit as seen from a cross-sectional side view revealing the spatial relationship of individual cell units; the upper catholyte separation chamber; a catholyte recycle compartment; and the relative positions of the cathodes and the anodes.

FIG. 2 is a cross-sectional representation of the housing unit 6 taken along lines 2—2 of FIG. 1. The cross-section illustrates the manner in which a plurality of cells are joined in series through their connections at the upper and lower ends to the anode plates 28 and 30 and to the cathode plates 38 and 40. The cathodes are connected to plates 38 and 40 using nuts 48 and electrically conductive washers 54. The anodes are bonded or welded to the anode plates 28 and 30.

FIG. 2 also shows the plurality of cathode chambers 12 is formed within the cell housing 6. Each of these cathode chambers 12 are connected with an cathode separation compartment 7 and a catholyte recycle compartment 26. Each cathode is electrically connected to a power supply (not shown) through plates 38 and 40, while each anode is connected to a power supply (not shown) through plates 28 and 30.

The anodes are hydraulically permeable and electrically conductive. They may be made of a variety of materials including a sheet of expanded metal perforated plate, punched plate, unflattened diamond shaped expanded metal or woven metallic wire. Preferably, the anodes are unflattened diamond shaped expanded metals. Metals suitable for use as anodes include tantalum, tungsten, columbium, zirconium, molybdenum, and preferably, titanium and alloys containing major amounts of these metals.

Optionally, the anodes may have a catalytically active coating on their surface. Materials suitable for use as electrocatalytically active materials include, for example, activating substances such as oxides of platinum group metals like ruthenium, iridium, rhodium, platinum, palladium, either alone or in combination with an oxide of a film-forming metal. Other suitable activating oxides include cobalt oxide either alone or in combination with other metal oxides. Examples of such activating oxides are found in U.S. Pat. Nos. 3,632,498; 4,142,005; 4,061,549; and 4,214,971.

The cathodes are, likewise, hydraulically permeable and electrically conductive. They may be made of a variety of materials including a sheet of expanded metal perforated plate, punched plate, unflattened diamond shaped expanded metal or woven metallic wire. Preferably, the cathodes are unflattened diamond shaped expanded metals. Metals suitable for use as cathode include, for example, iron, nickel, lead, molybdenum, cobalt, and alloys including major amounts of these metals, such as low carbon stainless steel.

Optionally, the cathodes may have a catalytically active coating on their surface. Materials suitable for use as electrocatalytically active materials include, for example, platinum group metal or metal oxide, such as ruthenium or ruthenium oxide. U.S. Pat. No. 4,465,580 describes the use of such cathodes.

Within cell housing 6, there is formed an anode compartment 13, into which anolyte is fed and in which electrolytic reactions occur during operation of the electrolytic cell. Anode compartment 13 is defined by the walls of cell housing 6; anode plates 28 and 30; and anodes 20.

Anode plates 28 and 30 may be electrically connected directly to a power supply or they may be electrically connected to corresponding cathode plates in other similar electrolytic cells (for series operation). Optionally, the anode plates 28 and 30 may be electrically connected to corresponding anode plates in other similar electrolytic cells (for parallel operation). Cells may be attached in a variety of ways including clamping, welding, and bonding. Optionally, and preferably, holes may be provided in plates 28, 30, 38, and 40 to permit such cells to be bolted together.

Interposed between each cathode 52 and each anode 20, is an ion permeable membrane. The ion permeable membrane serves to divide the anode compartment from the cathode compartment and limits the type and amount of material that passes between the anode compartment and the cathode compartments. The impermeable membrane may be a single layer membrane or a composite layer membrane.

Representative of the types of ion permeable membranes envisioned for use in this invention are disclosed in the following U.S. Pat. Nos.: 3,909,378; 4,329,435; 4,116,888; 4,065,366; 4,126,588; 4,209,635; 4,212,713; 4,251,333; 4,270,996; 4,123,336; 4,151,053; 4,176,215; 4,178,218; 4,340,680; 4,357,218; 4,025,405; 4,192,725; 4,330,654; 4,337,137; 4,337,211; 4,358,412; and 4,358,545. These patents are hereby incorporated by reference for the purpose of the membranes they disclose.

FIG. 2 shows a plurality of cathodes 52 electrically connected with each other and a plurality of anodes 20 electrically connected with each other. As can be seen, the anodes and cathodes resemble heat exchanger tubes. Thus, it may be convenient to think of the anodes as having the same design as a tube in a heat exchanger, with the cathodes comprising a second tube. However, the anodes are preferably constructed as a one-piece tube and the cathodes subsequently, individually inserted and fixed in place using nuts 48 and washers 54, rather than meshing a one-piece anode tube with a one-piece cathode tube.

The anodes and the cathodes may be electrically connected with the power supply (not shown) through the plates 28, 30, 38 and 40. The anodes are particularly conveniently located to be connected at a plurality of points. They can be connected using a plurality of baffles, like those commonly used in heat exchangers. The number and location of such baffles depends upon the height of the anode, the electrical conductivity of the material comprising the anode, and the current density at which the cell is desirably operated.

Figure 3:
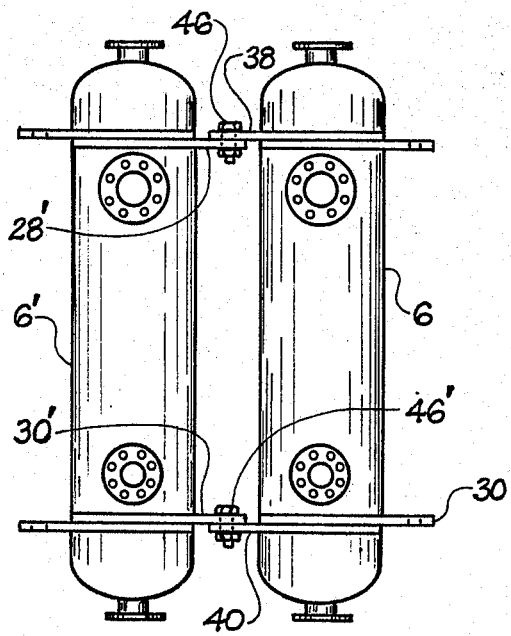
FIG. 3 is a side view of two cells connected in series.

FIG. 3 is a side view of two housing units 6 and 6' connected in series. The upper cathode plate 38 of housing unit 6 protrudes over and is bolted flush with the upper anode plate 28' of the other housing unit 6'. In a similar manner, lower cathode plate 40 of housing unit 6 protrudes over and is bolted flush with the lower anode plate 30 of housing unit 6'. Bolts 46 and 46' connect the anode plates with the cathode plates.

Figures 4, 5:
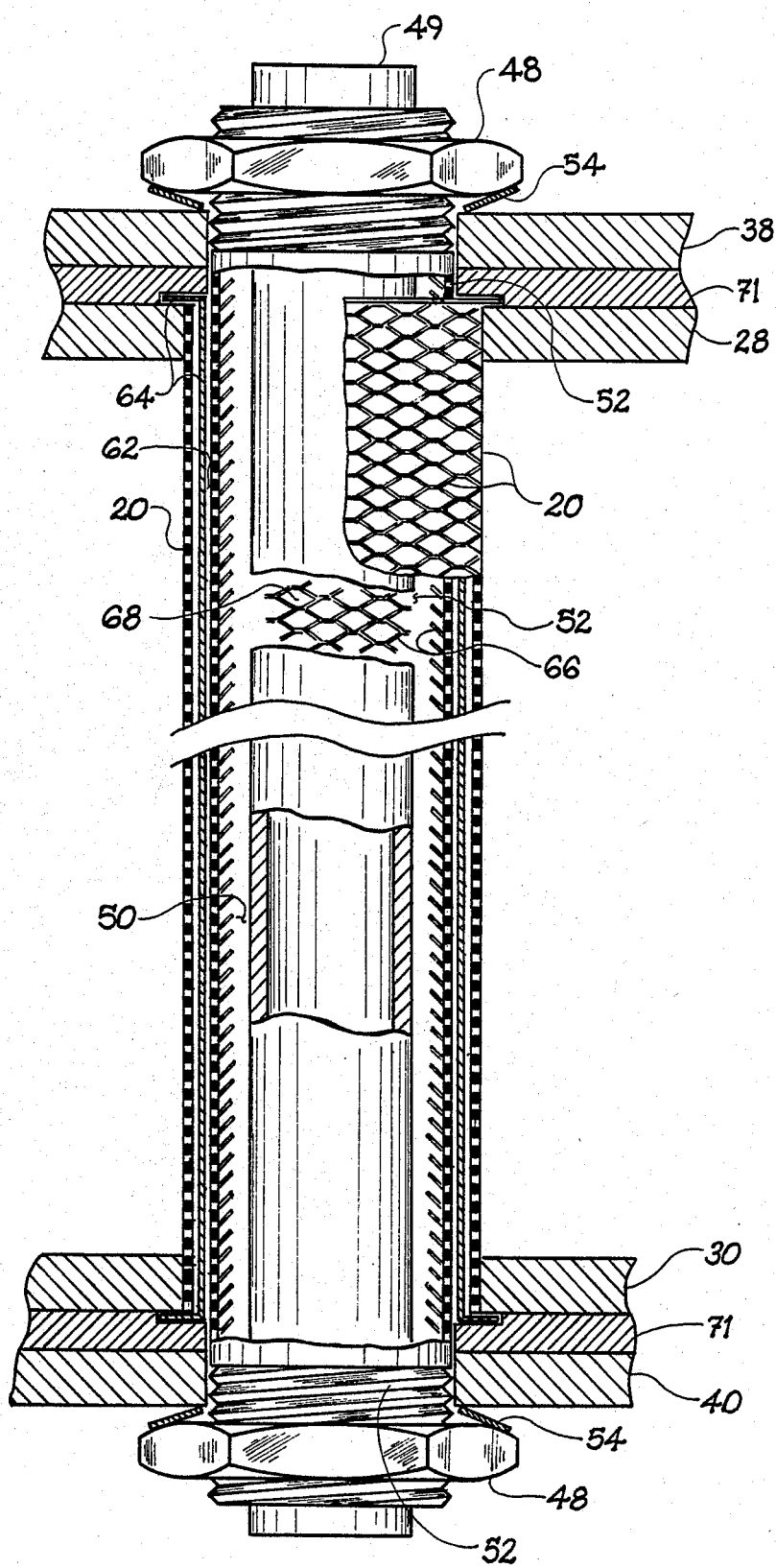
FIG. 4 is a partially exploded, partially phantom view of one cell unit.
FIG. 5 is a representation of the louvers found on the cathode and the anode viewed in a cross-sectional view of one wall of the cathode.

FIG. 4 is an exploded cross-sectional side view of the cathode/anode combination shown partially in phantom. The cell is framed by the cathode plates 38 and 40 and the anode plates 28 and 30. Electrically conductive washers 54 and nuts 48 secure the cathode 52 to the cathode plates 38 and 40. The cathode plates 38 and 40 are electrically connected to a power supply (not shown). The ends of the porous cathode 52 are threaded so as to engage the electrode plates with the nuts 48 and the washers 54 and thereby anchor the cathode 52 to the cathode plates 38 and 40.

Anode 20 surrounds, and is concentric with, the cathode 52. It is mechanically and electrically connected to anode plates 28 and 30, which are, in turn, connected to a power supply (not shown).

Electrical insulators 71 and 71' are positioned between anode plate 28 and cathode plate 38, and between anode plate 30 and cathode plate 40, respectively. These insulators minimize current flow between the electrode plates, and force electrical energy to pass through the electrodes.

Positioned between the cathode 52 and the anode 20 is an ion permeable membrane 64. It is in the shape of a hollow cylinder and separates and defines the anode compartment from the cathode compartment. It extends beyond the length of the anode on the top and is sealed between the electrical insulator 71 and anode plate 28 on the top of the cell unit. Likewise, it extends past the length of the anode on the bottom and is sealed between the electrical insulator 71' and anode plate 30.

Inside the cathode 52 is a recycle device 49 which forms a first annular space 50 between the recycle device 49 and the cathode 52. The recycle device is substantially hollow and is open at both ends. The first annular space 50 between the recycle device 49 and the cathode 52 is sufficiently large to allow a mixture of catholyte and gas to flow upward toward the cathode separation compartment 7.

FIG. 4 and FIG. 5 show that the cathode and the anode are hydraulically permeable. The cathode 52 and the anode 20 are illustrated as cylindrical, louvered sheets. The louvered perforations 66 perform several functions. First, they permit circulation of the catholyte from within cathode chambers 12 (as shown in FIGS. 1 and 2) to the second annular space 62 defined by the outer circumference of the cathode 52 and the ion permeable membrane 64 that surrounds it. Secondly, the louvers 66 themselves comprise small extensions of the cathode 52 that project out at an angle to the plane formed by the cathode 52 over the opening 68 that leads to the cathode chamber 12 from the second annular space 62 between the cathode 52 and the ion permeable membrane 64. These louvers catch the hydrogen gas and provide a location for the hydrogen molecules to accumulate and enhance their flow upward through the catholyte chamber 12 as bubbles.

The second annular space 62 may be designed to have almost any thickness. Preferably, however, the thinner the space the better, because, as is well known, minimizing the distance between the electrodes of an electrolytic cell reduces the resistance losses and allows the cell to operate more efficiently. In the present invention, however, it is necessary to provide sufficient space between the anode and the cathode to hold the thickness of the ion permeable membrane and to provide a space for catholyte to flow upward to sweep away gas as it is formed at the cathode and to minimize contact of the membrane with the cathode.

External to, and concentric with, the ion permeable membrane 64 is the anode 20 which, like the cathode 52 is perforated so as to permit circulation of anolyte into the anode compartment contacting the ion permeable membrane 64. Space 61 is the open area between the membrane 64 and the anode 20.

In operation of the method, an anolyte solution is fed into the anode compartment 13 through lower inlet 10. In the case of chlor-alkali electrolysis, the anolyte is an aqueous sodium chloride solution. In the anode compartment 13, the anolyte contacts the anode where it is electrolyzed to form chlorine. Chlorine rises to the top of the anode compartment 13 as bubbles where it is removed through opening 14. The anolyte-chlorine mixture is removed through opening 14 and may optionally be recycled through the anode compartment 13 through lower inlet 10.

A particularly preferred method for operating the cell involves the use of a high anolyte recycle rate from oening 14; through lower inlet 10; and through the anode compartment 13. The rate is preferably high enough to minimize the formation of a two-phase system in the anode compartment 13. The flow rate is preferably sufficiently high to remove the bubbles of chlorine from the anode compartment before they have an opportunity to coalesce to a degree sufficient to occupy a substantial part of the top portion of the anode compartment 13. This minimizes the likelihood that the membrane 64 will delaminate as a result of exposure to a liquid-gaseous two-phase system. If the method is operated in this preferred way, it is desirable to provide a holding chamber (not shown) in which the chlorine is separated from the anolyte before the anolyte is recycled to the anode compartment 13. Preferably, such a chamber is positioned at a higher elevation than the cell to minimize the flow of chlorine gas back into the anode compartment 13 and to help balance the pressure on both sides of the ion permeable membrane 64.

During cell operation, the anolyte flows through the hydraulically permeable anode 20 and into contact with the ion permeable membrane 64. The ion permeable membrane 64 allows hydrated sodium ions to permeate the membrane and pass into the cathode compartment 12. The sodium ions pass through the membrane; through second annular space 62; and to the cathode 52, where they are electrolyzed in the presence of water to form sodium hydroxide and hydrogen. The hydrogen forms on the surface of the cathode 52 and accumulates to form bubbles sufficiently large to be swept out by the upward flow of the recycling catholyte which is passing upward through the cathode chamber 12 and upward through the second annular space 62. This enhances the removal of the hydrogen gas from the surface of the cathode 52 and minimizes electrical inefficiencies caused by buildup of gas on the cathode.

Free water and anions are substantially completely prevented from passing through the membrane 64 into the cathode compartment 12. Because only water of hydration passes through the membrane 64 into the cathode compartment 12, it is sometimes necessary, and usually desirable, to add additional water to the catholyte to minimize the concentration of the sodium hydroxide solution produced therein. Water may be optionally added at a variety of locations including the cathode chamber 12, outlet 5, opening 18, or the line connecting outlet 5 to opening 18 (not shown).

The level of the catholyte in the cathode chamber is maintained so that it completely fills the cathode chambers 12 and partially fills the cathode separation compartment 7. Excess catholyte is removed from the cathode separation compartment 7 and at least a portion of it is preferably recycled through the opening 18; through cathode chambers 12; and back into the cathode separation compartment 7.

The catholyte preferably flows upward at a rate sufficient to help the hydrogen bubble to rise in the cathode chamber 12. Likewise, the catholyte preferably is flowed upward at a rate sufficient to minimize contact between the cathode and the membrane. The particular flow rate to match these requirements will vary with the thickness of the space between the anode and the cathode; the thickness of the membrane, the diameter of the internal recycle concentric tube, the diameter of the concentric cell; and the current density at which the cell is operated, i.e. how fast is hydrogen produced that must be swept away. A major portion of the catholyte is flowed upward through the center of the hollow cathode 52 in first annular space 50, with only a sufficient amount flowing between the cathode 52 and the membrane 64 to minimize the contact of the membrane 54 with the cathode 52.

After the catholyte gas mixture reaches the cathode separation compartment 7, the gas and the catholyte separate. The catholyte then flows downward through the inside of hollow recycle device 49. When it reaches the lower portion of the recycle device 49, it then is free to pass back into first annular space 50, where it mixes with gas being produced at the cathode, and because of its lower density as a result of being mixed with the gas, it rises through first annular space 50 and back into the cathode separation compartment. There, the flow cycle is repeated.

The size of the cell and the number of cell units can vary depending upon the output needed. For example, the cell may be composed of only one cell unit and need not be composed of a plurality of cell units. Likewise, the diameter of each cylindrically shaped cell unit may vary within a rather large range. Preferably, however, the diameters are in a range of from about ¼ inch to about 6 inches. Outside this range, the cells would still be operable, however, the given range is generally considered to be the most practical.

Likewise, the cell may be operated near atmospheric pressure or it may be operated under an elevated pressure. Pressures as high as 30 pounds per square inch or more may be conveniently used. In fact, the cylindrical shape of each cell unit makes the present cell particularly suitable for pressurized operation.

Further modifications and alternative embodiments of the invention will be apparent to those skilled in the art in view of this description. Accordingly, this description is to be considered as illustrative only and for the purpose of teaching those skilled in the art the manner of carrying out the invention. Various modifications may be made in the method, it being intended that all such modifications, alterations, and variations which fall within the spirit and scope of the appended claims be embraced thereby.

What is claimed:
1. A vertically disposed electrolytic cell comprising:
a hollow, cylindrically shaped recycle tube;

a hydraulically permeable, hollow, cylindrically shaped cathode concentric with and surrounding said recycle tube to define a first annular space therebetween;

a hydraulically permeable, hollow, cylindrically shaped anode concentric with and surrounding said cathode to define a second annular space therebetween; and a hollow, cylindrically shaped, ion permeable membrane positioned in said second annular space concentric with said cathode and said anode, said membrane dividing the second annular space into an anode compartment containing the anode and a cathode compartment containing the cathode, wherein the anode is selected from the group consisting of expanded metal, perforated plate, punched plate, unflattened diamond shaped expanded metal, and woven metallic wire.

2. The cell of claim 1 wherein the anode is constructed from a metal selected from the group of metals consisting of tantalum, tungsten, columbium, zirconium, molybdenum, titanium, and alloys containing major amounts of these metals.

3. The cell of claim 1 wherein the anode has a catalytically active coating on its surface.

4. The cell of claim 3 wherein the catalytically active coating is selected from the group consisting of oxides cobalt, ruthenium, iridium, rhodium, platinum, palladium, either alone or in combination with an oxide of a film-forming metal.

5. The cell of claim 3 wherein the catalytically active coating is selected from the group consisting of a platinum group metal and a platinum group metal oxide.

6. The cell of claim 5 wherein catalytically active coating is ruthenium or ruthenium oxide.

7. The cell of claim 1 wherein the cathode is selected from the group consisting of expanded metal, perforated plate, punched plate, unflattened diamond shaped expanded metal, and woven metallic wire.

8. The cell of claim 1 wherein the cathode is constructed from a metal selected from the group of metals consisting of iron, nickel, lead, molybdenum, cobalt, and alloys including major amounts of these metals.

9. The cell of claim 1 wherein the cathode has a catalytically active coating on its surface.

10. A cell comprising a plurality of the cells of claim 1 positioned adjacent to each other and enclosed by a housing.

11. A method for operating an electrochemical cell of the type having a hollow, cylindrically shaped reyccle tube; a hydraulically permeable, hollow, cylindrically shaped cathode concentric with and surrounding said recycle tube to define a first annular space therebetween; a hydraulically permeable, hollow, cylindrically shaped anode concentric with and surrounding said cathode to define a second annular space therebetween; and a hollow, cylindrically shaped, ion permeable membrane positioned in said second annular space concentric with said cathode and said anode, said membrane dividing the second annular space into an anode compartment containing the anode and a cathode compartment containing the cathode, said method comprising:
(a) flowing a catholyte from a lower portion of the first annular space, upward toward an upper portion of the first annular space, at least a portion of said flow passing adjacent to the cathode at a rate sufficient to sweep away at least a portion of any gas, formed during electrolytic operation of the cell;
(b) flowing the catholyte and gas upward and into a catholyte separation compartment;
(c) separating the gas from the catholyte; and
(d) recycling at least a portion of the catholyte through the hollow internal portion of the recycle tube to a lower portion of the first annular space, where the above-described flow pattern is repeated, wherein a major portion of upward catholyte flow is through the interior portion of the cathode.

12. The method of claim 11 wherein anolyte is removed from an upper portion of the anode compartment and recycled back into the anode compartment through a lower inlet.

13. The method of claim 12 wherein the anolyte is removed and recycled at a rate sufficiently fast to remove the gas before they have an opportunity to coalesce to a degree sufficient to occupy a substantial part of the top portion of the anode compartment.

14. The method of claim 13 wherein at least a portion of the gas in removed from the anolyte before it is recycled to the anode compartment.

15. The method of claim 12 wherein the catholyte contains hydrogen gas.

16. The method of claim 15 wherein the catholyte also contains sodium hydroxide.

17. The method of claim 15 wherein the gas is removed from the anolyte in a holding chamber external to the electrolytic cell.

18. The method of claim 11 wherein water is added to the catholyte before it is recycled through the cathode compartment.

19. The method of claim 11 wherein at least a portion of the gas is removed from the catholyte before it is recycled through the cathode compartment.

20. The method of claim 13 wherein at least one of the electrodes is in a louver shape.

21. The method of claim 20 wherein the cathode and the anode are in a louver shape.

* * * * *

UNITED STATES PATENT AND TRADEMARK OFFICE
CERTIFICATE OF CORRECTION

PATENT NO. : 4,784,735

DATED : November 15, 1988

INVENTOR(S) : Marius W. Sorenson

It is certified that error appears in the above-identified patent and that said Letters Patent is hereby corrected as shown below:

Col. 4, line 13; change "sepration" to --separation--.

Col. 7, line 25; change "oening" to --opening--.

Col. 9, line 50, Claim 11; change "reyccle" to --recycle--.

Col. 10, line 38, Claim 15; change "12" to --11--.

Col. 10, line 51, Claim 20; change "13" to --11--.

Signed and Sealed this

Twenty-fourth Day of October, 1989

Attest:

DONALD J. QUIGG

*Attesting Officer*   Commissioner of Patents and Trademarks